Dec. 2, 1952   L. BOTIMER   2,619,785
BEET HARVESTER
Filed May 27, 1946   3 Sheets-Sheet 1
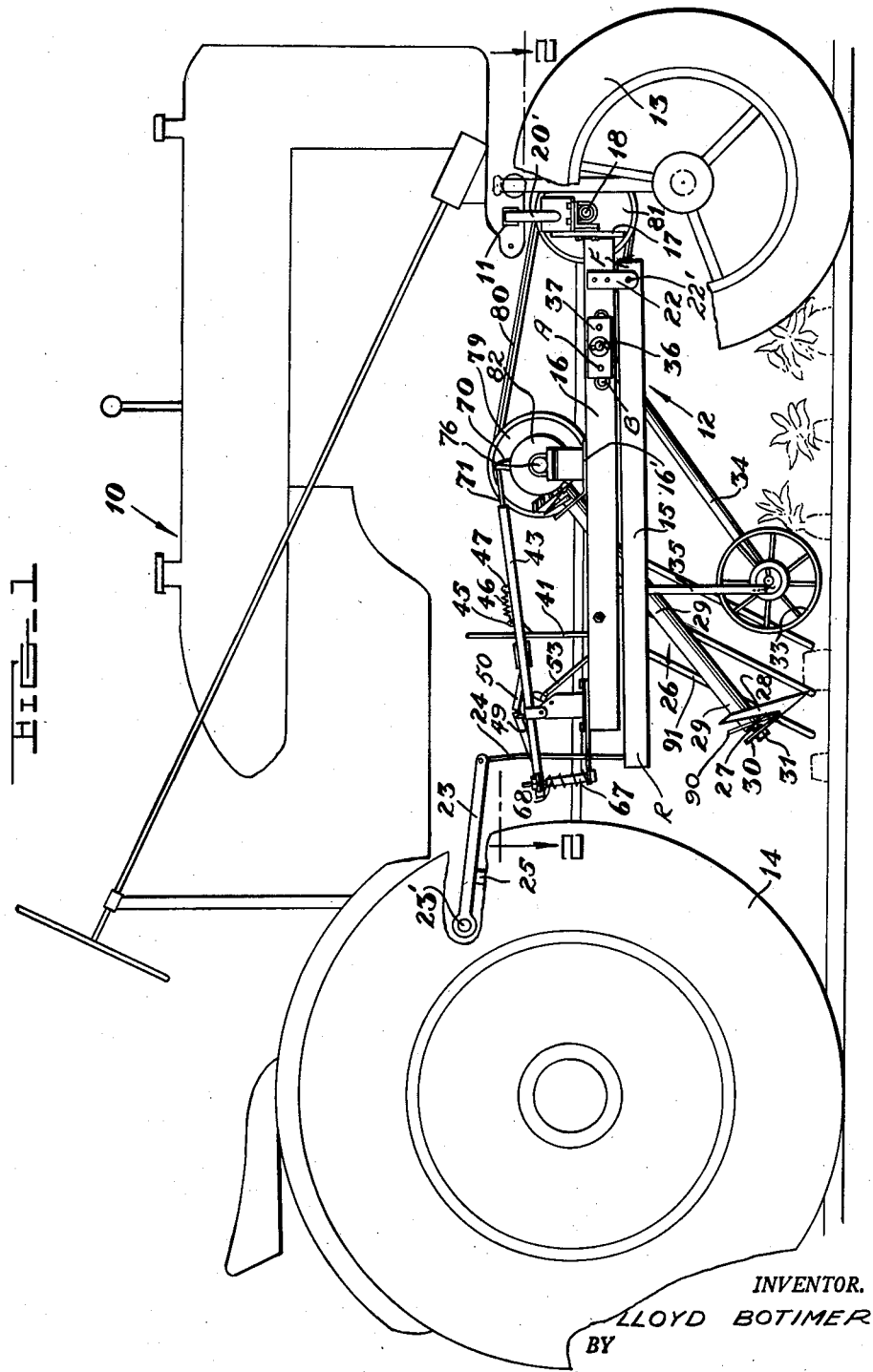
INVENTOR.
LLOYD BOTIMER
BY
Whittemore Hulbert & Belknap
ATTORNEYS Dec. 2, 1952  L. BOTIMER  2,619,785
BEET HARVESTER
Filed May 27, 1946  3 Sheets-Sheet 2
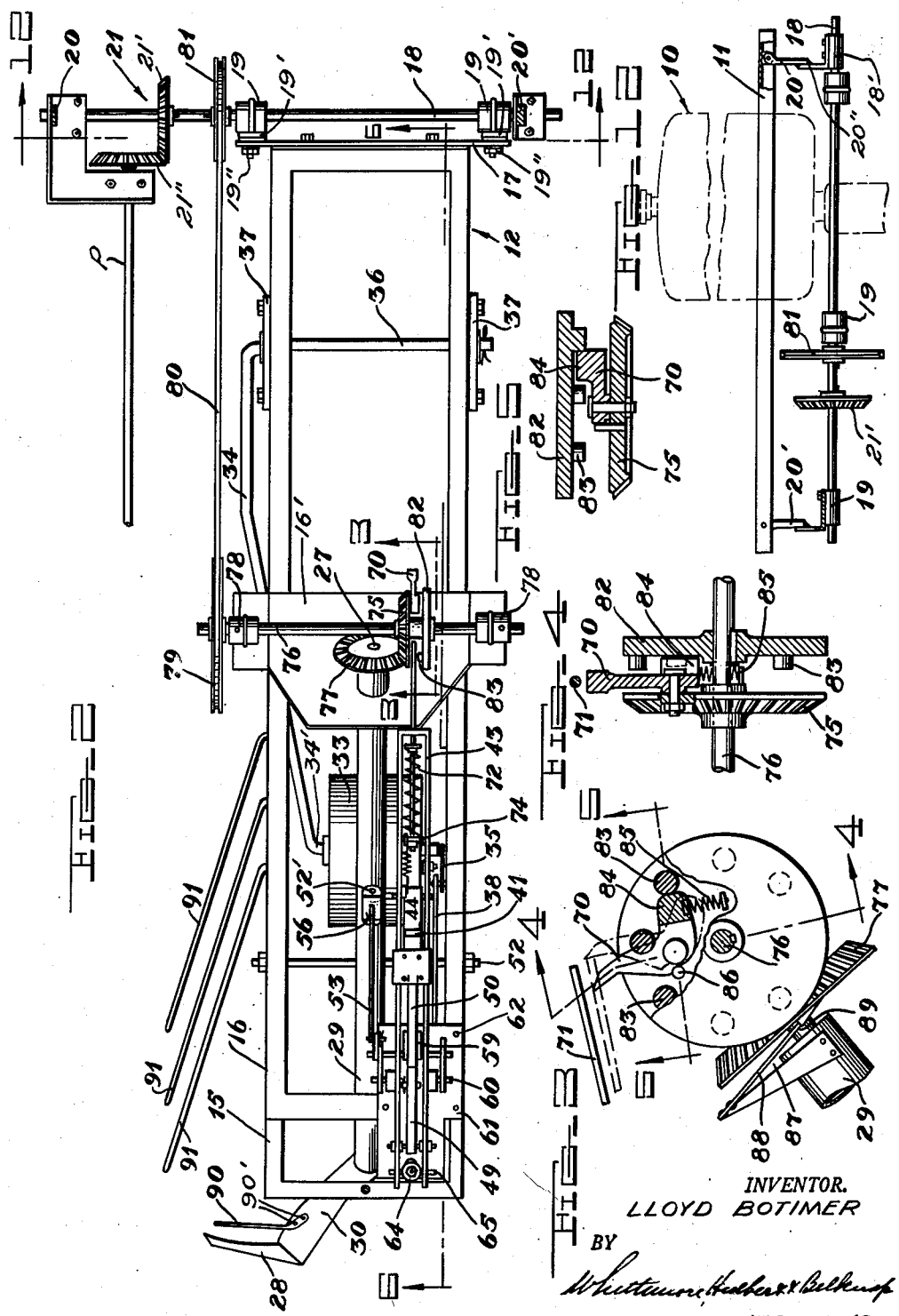
INVENTOR.
LLOYD BOTIMER
BY
ATTORNEYS Dec. 2, 1952 — L. BOTIMER — 2,619,785
BEET HARVESTER
Filed May 27, 1946 — 3 Sheets-Sheet 3
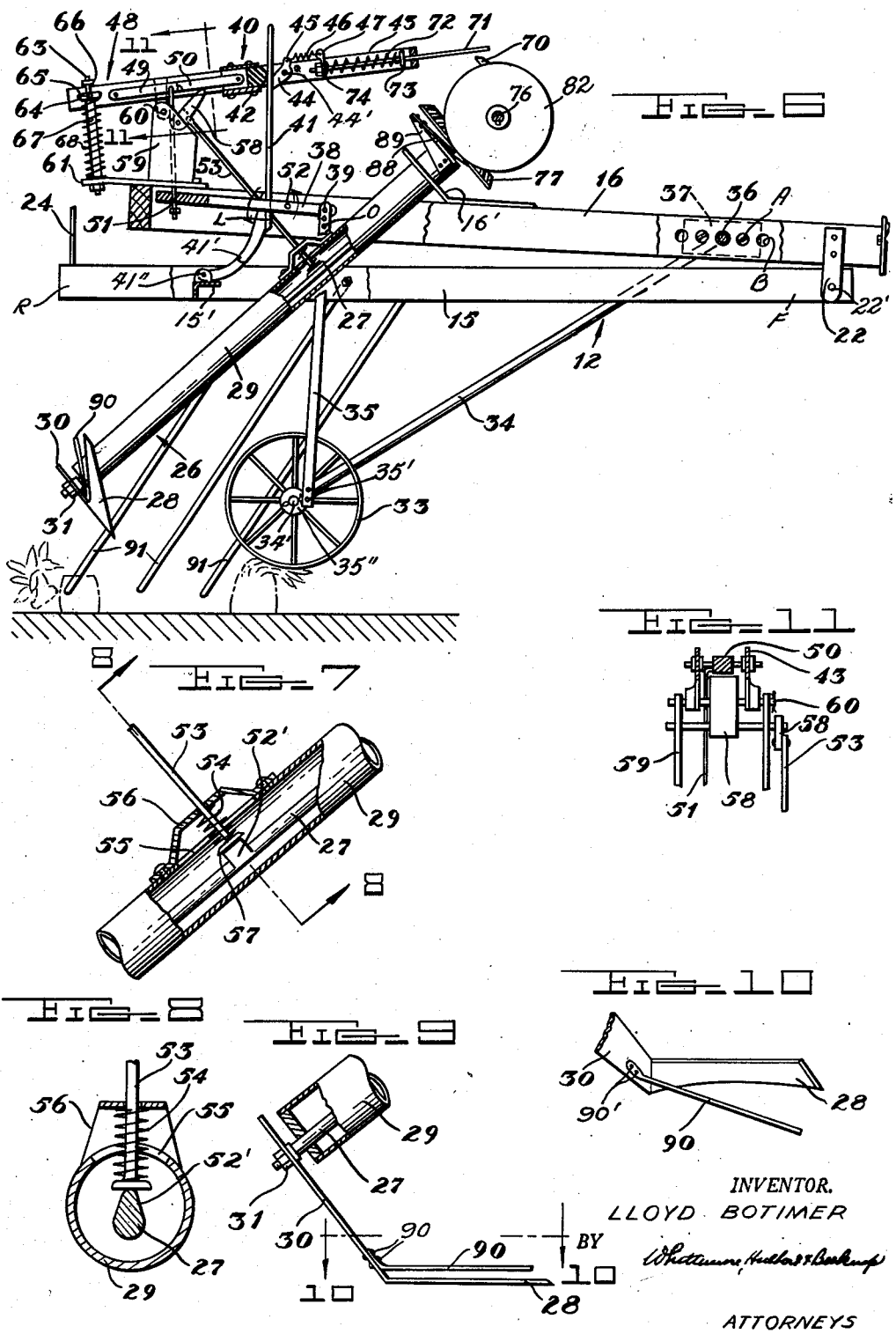
INVENTOR.
LLOYD BOTIMER
BY Whittemore, Hulbert & Belknap
ATTORNEYS Patented Dec. 2, 1952

2,619,785

UNITED STATES PATENT OFFICE 2,619,785

BEET HARVESTER

Lloyd Botimer, Vassar, Mich.

Application May 27, 1946, Serial No. 672,435

5 Claims. (Cl. 56—121.44)

1

This invention relates generally to agricultural equipment and refers more particularly to improvements in apparatus for topping beets or similar plants.

It has been proposed to provide beet topping equipment capable of being propelled along a row of sugar beets and having a rotatable knife operable periodically to cut the top portions off the beets while the row of beets is being traversed by the equipment. Rotation of the knife at the proper intervals to cut off the beet tops is effected by a feeler wheel suspended from the equipment in a position to successively engage the beets in advance of the knife. The feeler wheel rides over the tops of the beets and in so doing, not only connects the knife to suitable driving mechanism, but in addition, adjusts the elevation of the knife relative to the ground in proportion to the height of the beet to be cut by the knife. As a result, only the tops of the beets are cut off by the knife and waste is reduced to a minimum.

Beet topping equipment of the above general type has been found quite satisfactory for cutting the tops off the beets prior to removing the beets from the ground and has greatly facilitated harvesting of beets. However, equipment available in the past for accomplishing the above results has been rather complicated and usually required a considerable number of parts.

It is one of the objects of this invention to improve generally beet topping equipment of the above general type by simplifying the construction of the several parts involved and by reducing the number of these parts to a minimum. The simplicity of the equipment and other objects of this invention will be made more apparent as this description proceeds, especially when considered in connection with the accompanying drawings, wherein:

Figure 1 is a side elevational view of a tractor having beet harvesting equipment embodying the features of this invention attached thereto;

Figure 2 is a fragmentary enlarged plan view of the beet harvesting equipment;

Figure 3 is an enlarged sectional view taken on the line 3—3 of Figure 2;

Figures 4 and 5 are respectively sectional views taken on the lines 4—4 and 5—5 of Figure 3;

Figure 6 is a sectional view taken substantially on the line 6—6 of Figure 2;

Figure 7 is an enlarged view partly in section of a part of the mechanism shown in Figure 6;

Figure 8 is an enlarged cross sectional view taken substantially on the line 8—8 of Figure 7;

2

Figure 9 is an enlarged elevational view partly in section showing the cutting blade in its operative position;

Figure 10 is a top plan view of the cutting blade shown in Figure 9;

Figure 11 is a sectional view taken on the line 11—11 of Figure 6;

Figure 12 is a sectional view taken substantially on the line 12—12 of Figure 2.

The beet topping equipment illustrated herein is designed for attachment to conventional tractors and the cutting means thereof is adapted to be driven by the power take-off mechanism forming a part of the standard equipment of most tractors designed for agricultural use. A typical tractor is indicated in Figure 1 of the drawings by the reference character 10 having the usual power take off mechanism (not shown) and having provision at one end for supporting a draw bar 11.

The beet topping equipment is indicated in the drawings by the reference character 12 and is positioned beneath the frame of the tractor between the front wheels 13 and the rear wheels 14. The beet topping equipment comprises a main supporting frame 15 and an auxiliary frame 16. The auxiliary frame 16 has a mounting plate 17 at the front end thereof, and is pivotally supported on a transverse shaft 18 by journals 19 carried by brackets 19' which are fastened to the plate 17 by fastener elements 19''. The shaft 18 is suspended from opposite ends of the draw bar 11 by hangers 20, 20' and is operatively connected to the power take-off mechanism of the tractor by gearing 21. In addition, the shaft 18 is journalled in a bearing 18' supported on the hanger 20 by a bracket 20''. The gearing 21 has a bevelled gear 21' secured to the shaft 18 and also has a second bevelled gear 21'' meshing with the gear 21' and secured to the power takeoff shaft P of the tractor. It follows from the foregoing that the auxiliary frame 16 is supported for vertical swinging movement about the axis of the shaft 18.

The supporting frame 15 is positioned below the auxiliary frame 16 and is pivotally connected at its front end F to the auxiliary frame by brackets 22. The brackets 22 are secured to the frame 15 adjacent the front end F and are pivoted to the frame 16 by pins 22'. The rear end of the main frame 15 is connected to the front end of an arm 23 by a rod 24, and the rear end of the arm 23 is pivoted by a pin 23' to a part of the tractor for vertical swinging movement. Downward movement of the arm 23 is limited by a stop 25 suitably secured to a part of the tractor and engageable with the arm intermediate the ends of the latter. The purpose of the above mounting is to enable limited pivotal movement of the main frame 15 as a unit with the frame 16 to initiate operation of the casting or throwing means to be more fully hereinafter described.

The auxiliary frame 16 forms a support for a cutter assembly 26 comprising a drive shaft 27 and a cutting blade 28. The drive shaft 27 is rotatably supported in a tubular housing 29 suitably secured to the auxiliary frame 16 by the plate 16' with its axis inclined forwardly from the lower end of the housing in the manner clearly shown in Figure 6 of the drawings. Referring now to Figure 9 of the drawings, it will be noted that the knife blade 28 is carried by a plate 30 supported in a plane perpendicular to the drive shaft 27 and secured to the lower end of the drive shaft by a clamping nut 31. The blade 28 extends at such an angle to the plate 30 that it assumes a position substantially parallel to the ground during the actual cutting operation. In this connection it will be noted from Figure 2 of the drawings that the drive shaft 27 is supported intermediate opposite sides of the auxiliary frame 16 to assume a position directly above a row of beets when the row is straddled by the tractor. The arrangement is such that rotation of the knife by the drive shaft 27 swings the blade 28 across the row of beets and slices the top portions off the beets.

The elevation of the knife 28 is varied between successive cutting operations by an amount proportionate to the height of the beets projecting above the ground, and this is accomplished by providing a feeler wheel 33. The feeler wheel 33 is positioned directly in advance of the knife 28 and is also carried by the auxiliary frame 16. As shown particularly in Figure 6 of the drawings, the feeler wheel 33 is connected to the auxiliary frame by a pair of struts 34 and 35. The upper end of the inclined strut 34 is provided with a portion 36 which extends transversely of the auxiliary frame 16 adjacent the front end of the latter and is pivoted to a pair of plates 37. The plates 37 are respectively secured to opposite sides of the auxiliary frame by fastener elements A and are adjustable longitudinally of the auxiliary frame to vary the distance between the feeler wheel 33 and the knife 28. As shown in Figure 6 of the drawings, the opposite side bars of the auxiliary frame 16 are formed with a series of openings B spaced from each other lengthwise of the frame 16 and adapted to selectively receive the fastener elements A to enable locating the feeler wheel in different positions relative to the knife 28. The lower end of the strut 34 extends laterally to provide a shaft 34' upon which the feeler wheel 33 is journalled. The vertical strut 35 is attachable to the auxiliary frame through an arm 38 and is secured to the front end of the arm by a pin 39. It will be noted from Figure 6 of the drawings that the upper end of the strut 35 is formed with a plurality of vertically spaced openings O for receiving the pin 39 and thereby enables varying the elevation of the feeler wheel 33 relative to the ground. The lower end of the strut 35 is secured by fasteners 35' to a part 35'' also journalled on the shaft 34'.

It follows from the above that the feeler wheel 33 successively engages the beets in advance of the knife 28, and raises the rear end of the auxiliary frame 16 an amount depending upon the height of the beet engaged by the feeler wheel. Inasmuch as the knife 28 is carried by the auxiliary frame, it is moved upwardly as a unit with the auxiliary frame. The rear end of the auxiliary frame 16 is momentarily held in its raised position by means of a friction device 40. This device comprises a vertical bar 41 having the lower end L suitably secured to the main supporting frame 15 and projecting upwardly through the auxiliary frame 16. As shown in Figure 6 the lower end of the bar 41 is fixed to an upstanding arm 41' on a cross bar 15' of the frame 15. The rear side of the bar 41 is adapted to be frictionally engaged by a shoe 42 slidably mounted on an arm 43 having provision for enabling the upper end of the bar 41 to extend therethrough in advance of the shoe. The front side of the bar 41 is engaged by one end of a bell crank lever 44 pivoted as at 44' to the arm 43 and having the other end 45 connected to the rear end of a coil spring 46. The front end of the coil spring 46 is anchored on a plate 47 secured to the arm 43 in advance of the bell crank lever 44. Thus, the spring 46 normally urges the bell crank lever into frictional engagement with the front side of the bar 41 directly opposite the shoe 42, so that the bar 41 is clamped therebetween.

The shoe 42 is moved into and out of frictional engagement with the bar 41 by means of toggle linkage 48 comprising a pair of links 49 and 50. The inner ends of the links are pivotally connected together and the outer ends of the links are respectively pivotally connected to the shoe and to the arm 43. It is to be noted that the pivotal connection between the inner ends of the links is such as to prevent relative movement of the links in a downward direction from the position thereof shown in Figure 6 of the drawing. The link 49 is connected adjacent its inner end to the upper end of a pull rod 51 having the lower end connected to the rear end of the arm 38 which is pivoted intermediate its ends on the auxiliary frame 16 by a horizontal pin 52. Inasmuch as the vertical strut 35 for the feeler wheel 33 is pivoted to the front end of the arm 38, it follows that upward movement of the feeler wheel not only raises the rear end of the auxiliary frame 16, but also swings the arm 38 in a counterclockwise direction about the pin 52 to straighten the toggle linkage and move the shoe into frictional engagement with the bar 41. Thus the holding means 40 for the auxiliary frame is operated in response to upward swinging movement of the auxiliary frame 16 by the feeler 33.

The shoe 42 is released from frictional engagement with the bar 41 in response to rotation of the knife 28 by the drive shaft 27. Referring to Figures 6 to 8 inclusive of the drawings, it will be noted that the drive shaft 27 is provided with a cam 52' intermediate the ends thereof adapted to engage the lower end of a rod 53 and to move the rod 53 in an upward direction against the action of a spring 54. The rod 53 projects into the housing 29 through a slot 55 formed in the wall of the housing directly opposite the cam 52' and the rod is guided by a bracket 56 secured to the housing 29. The spring 54 surrounds the lower end of the rod 53 with the upper end abutting the bracket 56 and with the lower end engaging a head 57 formed on the lower end of the rod for contact with the cam 52'. Thus the spring 54 normally urges the head 57 on the rod into frictional engagement with the cam 52'. The upper end of the rod is connected to an operating lever 58 having the lower end pivoted to a bracket 59 and having the upper end positioned for engagement with the link 50 intermediate the ends of the latter. The high point of the cam 52 is so positioned with respect to the knife 28 that after the latter completes its cutting operation, the cam engages the rod 53 and moves the latter upwardly. Movement of the rod 52 upwardly swings the lever 58 into engagement with the link 50 and breaks the toggle 48 so that the shoe 42 is withdrawn from the bar 41. This action permits the auxiliary frame 16 to return to its lowermost position relative to the main frame 15 shown in Figure 1 of the drawings. As will be presently described in detail, the drive shaft 27 for the knife or cutter 28 is driven by the shaft 18, which in turn, is driven by the power take-off mechanism of the tractor. Thus rotation of the cutter 28 or releasing cam 52' by the shaft 27 is correlated to the linear travel of the tractor, and the cam 52' operates to release the holding means 40 after the tractor has travelled a certain distance. In other words the cutter or knife 28 is definitely held in a fixed elevated position while passing through the adjacent beet top.

In the present instance movement of the auxiliary frame in an upward direction initiates rotation of the drive shaft 27 and return movement of the auxiliary frame discontinues rotation of the drive shaft 27. For accomplishing this result, the arm 43 is supported for vertical swinging movement on a pivot pin 60 journalled on the upper end of the bracket 59 and the rear end of the arm projects beyond the pivot pin 60. The rear end of the arm 43 is connected to a plate 61 which is secured to the rear end of the auxiliary frame 16 by suitable fastener elements 62. The connection between the arm 43 and the plate 61 comprises a bolt 63 having the lower end secured to the plate 61 and having the upper end slidably engaging a member 64 which is secured to the rear end of the arm 43 by pins 65. A nut 66 is preferably threaded on the extreme upper end of the bolt to prevent accidental disengagement of the member 64 from the bolt. A tubular spacer 67 is supported on the bolt between the plate 61 and the member 64. The upper end of the spacer cooperates with the nut 66 to limit the extent of swinging movement of the arm 43 about the pivot pin 60. A coil spring 68 surrounds the spacer 67 between the member 64 and the plate 61. This coil spring normally tends to swing the arm 43 about the pivot 60 in a direction to engage the member 64 with the nut 66. The above arrangement is such that when the toggle linkage 48 is broken, or in other words, when the shoe 42 is withdrawn from the bar 41, the spring 68 acts on the member 64 to swing the arm 43 in a clockwise direction about the pivot pin 60 to engage the member 64 with the nut 66. The arm assumes the above position when the auxiliary frame 16 is in its lowermost position relative to the main frame 15, and as shown in Figure 1 of the drawings, the front end of the arm engages a dog 70 to hold the latter in a position wherein the drive shaft 27 is disconnected from its source of power. Actually, the dog 70 is engaged by a spring pressed plunger 71 slidably supported on the forward end of the arm 43 and projecting forwardly beyond the arm. The plunger is normally urged to its outermost position by means of a coil spring 72 having the front end engaging an abutment 73 and having the rear end engaging a part 74 fixed to the arm.

The dog 70 is shown in Figures 3 to 5 inclusive as pivoted intermediate its ends on a drive gear 75 rotatably supported on a shaft 76 and adapted to mesh with a beveled gear 77 secured to the upper end of the drive shaft 27. The shaft 76 extends in a direction transverse to the auxiliary frame 16 and is journalled in bearings 78 mounted on the plate 16' of the auxiliary frame 16. A pulley 79 is secured to one end of the shaft 76 and a belt 80 is provided for connecting the pulley 79 to the shaft 18. As stated above, the shaft 18 is driven from the power take-off of the tractor and the belt 80 is reeved around a pulley 81 secured to the shaft 18.

A clutch disc 82 is secured to the shaft 76 adjacent the beveled gear 75 and is provided with circumferentially spaced pins 83 which extend from the disc 82 parallel to the axis of the shaft 76. The outer end of the dog 70 is adapted to be engaged by the spring pressed plunger 71 and the inner end of the dog is formed with an enlargement 84 adapted to be urged by a spring 85 into wedging engagement with one of the pins 83. A stop 86 is provided on the gear 75 for engaging the dog to limit the extent of swinging movement of the latter by the spring 85.

The above construction is such that when the arm 43 is swung to its lowermost position shown in Figure 1 of the drawings, the plunger 71 acts on the outer end of the dog 70 to swing the dog to the dotted line position thereof shown in Figure 3 of the drawings, wherein the enlargement 84 is positioned radially inwardly of the pins 83. As a result the clutch disc 82 rotates relative to the gear 75 without interference from the dog 70. On the other hand, when the arm 43 is swung to its uppermost position shown in Figure 6 of the drawings, the spring 85 rocks the dog 70 to the full line position shown in Figure 3 of the drawings, wherein the enlargement 84 wedges against one of the pins 83 and connects the clutch disc 82 to the gear 75. Thus the gear 75 rotates as a unit with the shaft 76 and imparts rotation to the knife driving shaft 27. In this connection, it will be noted that reverse rotation of the beveled gear 77 on the drive shaft 27 is prevented by a ratchet 87. The ratchet comprises a leaf spring 88 having one end secured to the housing 29 and having the opposite end engageable with a shoulder 89 formed on the underside of the gear 77. The arrangement is such that the spring 88 is depressed by the shoulder 89 upon rotation of the gear 77 by the gear 75, so as not to interfere with rotation of the knife. However, when rotation of the knife is discontinued, any tendency for the drive shaft 27 to rotate in the opposite direction, due to the unbalanced condition of the knife, is prevented by engagement of the shoulder 89 with the free end of the spring 88.

*Operation*

Assuming that the parts of the beet topping equipment are in the relative positions shown in Figure 1 with respect to a row of beets, it will be noted that as the tractor 10 is advanced along the row of beets, the feeler wheel 33 engages the adjacent beet top, and is raised to lift the rear end of the auxiliary frame 16 relative to the main frame 15. As the auxiliary frame 16 is raised, the arm 38 is swung in a counterclockwise direction about the pin 52 and the toggle linkage 48 is straightened to move the shoe 42 into frictional engagement with the bar 41 projecting upwardly from the main frame. At the same time, the front end portion of the arm 43 is raised about the pin 60 to disengage the spring pressed plunger it from the dog 70. As the front end portion of the arm 43 is raised, the spring 67 at the rear end of the arm is compressed, and the arm is held in this raised position by the shoe 42.

As soon as the spring pressed plunger 71 releases the dog 70, the spring 85 rocks the dog to the position shown in Figure 3 of the drawings, wherein the enlargement 84 on the dog wedges against the adjacent pin 83 on the clutch disc 82. As a result, the clutch disc 82 is connected to the beveled gear 77, and the knife 28 is rotated one complete revolution. By the time rotation of the knife 28 is initiated, the knife assumes a position in operative relation to the beet previously engaged by the feeler wheel, so that the top of this beet is removed during rotation of the knife. It will also be understood from the foregoing that the cutter or knife 28 as well as the releasing cam 52' are driven by the shaft 27, and that this shaft is in turn rotated by the power take-off mechanism of the tractor. As a result, the cutter or knife 28 is definitely held in its elevated position throughout a predetermined travel of the tractor regardless of whether the feeler wheel 33 is or is not supported by an adjacent beet.

As the knife driving shaft 27 continues to rotate, the cam 52' operates the lever 58 to break the toggle linkage 48 and thereby withdraw the shoe 42 from engagement with the bar 41. As soon as the shoe 42 releases the bar 41, the spring 68 acts on the rear end of the arm 43 to swing the front end of the arm downwardly wherein the plunger 71 again assumes a position in the path of travel of the dog 70. As soon as the dog 70 engages the spring pressed plunger 71, the dog is rocked to the dotted line position shown in Figure 3 of the drawings to release the clutch disc 82 from the gear 75 and thereby discontinue rotation of the knife. It will, of course, be understood that the auxiliary frame 16 is lowered by the action of gravity to the position thereof shown in Figure 1 as soon as the shoe 42 is released from the bar 41. The above cycle of operation is repeated each time a beet is engaged by the feeler wheel 33.

The portions of the sugar beet which are cut off make excellent feed for cattle or sheep and, accordingly, is a valuable by-product of the sugar beets. It is important, therefore, to salvage the beet tops, and this is accomplished herein by arranging a casting rod 90 on the knife in a position to engage the severed beet tops and toss the latter to one side where they may be readily claimed before digging the standing portions of the beets from the ground. The casting rod 90 is secured to the plate 30 by fastener elements 90' and is positioned to the rear of the cutting edge of the knife 28. In order to prevent throwing the beet tops in the path of the tractor wheels, suitable shields 91 may be provided on the frame 15, as shown in Figures 2 and 6 of the drawings.

What I claim as my invention is:

1. Beet harvesting apparatus comprising a supporting frame movable over a row of beets, an auxiliary frame pivoted at one end to the supporting frame for vertical swinging movement, a rotatable cutting element supported on the auxiliary frame adjacent the swinging end of the latter and positioned to successively engage the beets to cut the top portions off the beets, a feeler supported on the auxiliary frame in a position to engage the beets in advance of the cutting element to raise the auxiliary frame, driving means for the cutting element, means for connecting the driving means to the cutting element in response to upward swinging movement of the auxiliary frame and for disconnecting the driving means from the cutting element in response to downward movement of the auxiliary frame, releasable latch means for holding the auxiliary frame together with the cutting element in an elevated position determined by engagement of the feeler with a contacted beet, and means responsive to rotation of the cutting element for releasing the latch means to permit downward movement of the auxiliary frame.

2. Beet harvesting apparatus comprising a supporting frame movable over a row of beets, a rotatable cutting element carried by the frame in a position to successively engage the beets and cut the top portions off the beets, means supporting the cutting element on said frame adjustable vertically to vary the elevation of the cutting element relative to the ground, a feeler connected to the supporting frame in a position to engage the beets in advance of the cutting element and lift the supporting means together with the cutting element prior to the cutting operation, driving means for rotating the cutting element, a releasable clutch for connecting the driving means to the cutting element and engageable to rotate the cutting element upon upward movement of the supporting means, releasable latch means for holding the supporting means in an elevated position determined by engagement of the feeler with a contacted beet, means operated by rotation of the cutting element for releasing the latch means subsequent to completion of the cutting operation, and means for disengaging the clutch in response to releasing said latch means.

3. In combination with a tractor having a power takeoff shaft, beet topping apparatus comprising a supporting frame attachable to the tractor for movement by the tractor over a row of beets, an auxiliary frame connected to the supporting frame for movement relative thereto in an up and down direction, a cutting element supported on the auxiliary frame for rotation and having an operating shaft, driving means connecting the operating shaft to the power takeoff shaft, feeler means carried by the auxiliary frame in a position to successively engage the beets in advance of the cutting element and raise said auxiliary frame together with the cutting element prior to engagement of the cutting element with the adjacent beet, a releasable connection between the cutting element operating shaft and driving means responsive to upward movement of the auxiliary frame to connect the driving means to the operating shaft for said cutting element, releasable latch means resisting downward movement of the auxiliary frame together with the cutting element from an elevated position determined by engagement of the feeler means with the contacted beet but permitting relatively free upward movement of the auxiliary frame and cutting element relative to the supporting frame, and means operated by the cutting element operating shaft for releasing the latch means subsequent to the operation of the cutting element to cut the top off the adjacent beet.

4. The beet harvesting apparatus set forth in claim 3 having means for disconnecting the driving means from the cutting element operating shaft subsequent to releasing the latch means.

5. In combination with a tractor having a power takeoff shaft, a beet topping apparatus comprising a supporting frame adapted to be moved by the tractor over a row of beets, an auxiliary frame mounted on the supporting frame for movement relative to the latter in an up and down direction, a cutting element supported on the auxiliary frame for rotation, feeler means supported on the auxiliary frame in a position to successively engage beets in advance of the cutting element and raise the auxiliary frame together with said cutting element prior to the cutting operation, means for connecting the cutting element to the tractor power takeoff shaft including a clutch engageable in the raised position of the auxiliary frame to rotate the cutting element, releasable latch means having coacting parts respectively carried by the supporting and auxiliary frames and frictionally engageable to hold the auxiliary frame in an elevated position determined by engagement of the feeler means with the adjacent beet, and means for releasing the latch means and said clutch in response to a predetermined extent of rotation of the tractor power takeoff shaft.

LLOYD BOTIMER.

REFERENCES CITED

The following references are of record in the file of this patent:

UNITED STATES PATENTS

| Number | Name | Date |
|---|---|---|
| 677,250 | Miller | June 25, 1901 |
| 1,055,023 | De Leon | Mar. 4, 1913 |
| 1,134,184 | Cook | Apr. 6, 1915 |
| 1,176,850 | Phipps | Mar. 28, 1916 |
| 1,303,798 | Jones | May 13, 1919 |
| 1,519,198 | Franke | Dec. 16, 1924 |
| 1,568,811 | Djuberg | Jan. 5, 1926 |
| 2,369,850 | Powers | Feb. 20, 1945 |
| 2,486,915 | Botimer | Nov. 1, 1949 |
| 2,509,757 | Botimer | May 30, 1950 |

FOREIGN PATENTS

| Number | Country | Date |
|---|---|---|
| 54 900 | Austria | Aug. 10, 1912 |